(12) United States Patent
Shim et al.

(10) Patent No.: US 10,793,476 B2
(45) Date of Patent: Oct. 6, 2020

(54) METHOD OF PREPARING CERIUM BORIDE POWDER

(71) Applicant: KOREA INSTITUTE OF SCIENCE AND TECHNOLOGY, Seoul (KR)

(72) Inventors: Jae Hyeok Shim, Seoul (KR); Tae Jun Ha, Seoul (KR); Jin Yoo Suh, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 91 days.

(21) Appl. No.: 16/198,878

(22) Filed: Nov. 23, 2018

(65) Prior Publication Data

US 2020/0062655 A1    Feb. 27, 2020

(30) Foreign Application Priority Data

Aug. 21, 2018    (KR) .................. 10-2018-0097200

(51) Int. Cl.
| | |
|---|---|
| C04B 35/00 | (2006.01) |
| C04B 35/58 | (2006.01) |
| C04B 35/626 | (2006.01) |
| C01F 17/00 | (2020.01) |

(52) U.S. Cl.
CPC .......... *C04B 35/5805* (2013.01); *C01F 17/00* (2013.01); *C04B 35/62615* (2013.01); *C01P 2002/72* (2013.01); *C01P 2004/03* (2013.01); *C01P 2004/04* (2013.01); *C01P 2004/61* (2013.01); *C04B 2235/3804* (2013.01); *C04B 2235/5436* (2013.01); *C04B 2235/612* (2013.01)

(58) Field of Classification Search
CPC ........... C04B 35/62615; C04B 35/5805; C01F 17/00; C01F 17/10
USPC ................................................... 423/263, 289
See application file for complete search history.

(56) References Cited

FOREIGN PATENT DOCUMENTS

CN        101891216 A    11/2010

OTHER PUBLICATIONS

Translation of CN 101891216 A, Nov. 2010. (Year: 2010).*
CN 103466649 A, Dec. 2013 (Year: 2013).*
Akgun et al., "Mechanochemical and combustion synthesis of CeB6", International Journal of Materials Research, 2013, pp. 403-407, vol. 104.

(Continued)

*Primary Examiner* — Steven J Bos
(74) *Attorney, Agent, or Firm* — Cantor Colburn LLP

(57) ABSTRACT

A method of preparing cerium boride powder, according to the present invention, includes a first step for generating mixed powder by mixing at least one selected from among cerium chloride ($CeCl_3$) powder and cerium oxide ($CeO_2$) powder, at least one selected from among magnesium hydride ($MgH_2$) powder and magnesium (Mg) powder, and boron oxide ($B_2O_3$) powder, a second step for generating composite powder including cerium boride ($Ce_xB_y$) and at least one selected from among magnesium oxide (MgO) and magnesium chloride ($MgCl_2$), by causing reaction in the mixed powder at room temperature based on a ball milling process, and a third step for selectively depositing cerium boride powder by dispersing the composite powder in a solution.

9 Claims, 7 Drawing Sheets

Generate mixed powder by mixing at least one selected from among $CeCl_3$ powder and $CeO_2$ powder, at least one selected from among $MgH_2$ powder and Mg powder, and $B_2O_3$ powder — S100

Generate composite powder including $Ce_xB_y$ and at least one selected from among MgO and $MgCl_2$, by causing reaction in mixed powder at room temperature based on ball milling process — S200

Selectively deposit cerium boride powder by dispersing composite powder in solution — S300

(56) References Cited

OTHER PUBLICATIONS

Han Zhang et al., "Single-Crystalline CeB6 Nanowires", Journal of the American Chemical Society, 2005, pp. 8002-8003, vol. 127, No. 22, American Chemical Society.
Maofeng Zhang et al., "Direct low-temperature synthesis of RB6 (R=Ce,Pr,Nd) nanocubes and nanoparticles", Journal of Solid State Chemistry, 2009, pp. 3098-3104, vol. 182, Elsevier Inc.
Omid Torabi et al., "Mechanochemical Synthesis of High Crystalline Cerium Hexaboride Nanoparticles from CeO2—B2O3—Mg Ternary System", Journal of the Chinese Chemical Society, 2016, pp. 379-384, vol. 63.
Xiulin Fan et al., "Significantly improved hydrogen storage properties of NaAlH4 catalyzed by Ce-based nanoparticles", Journal of Materials Chemistry A, 2013, pp. 9752-9759, The Royal Society of Chemistry.
Korean Office Action for Application No. 10-2018-0097200 dated Dec. 18, 2019, citing the above reference. In conformance with MPEP 609—Concise explanation of the relevance includes issue date KR OA and references cited therein.

\* cited by examiner (1) Powder obtained after milling $CeO_2$-$B_2O_3$-$MgH_2$ powder
(2) $CeB_6$ powder after deposition (1) Powder obtained after milling $CeO_2$-$B_2O_3$-Mg powder
(2) $CeB_6$ powder after filtering

METHOD OF PREPARING CERIUM BORIDE POWDER

CROSS-REFERENCE TO RELATED PATENT APPLICATION

This application claims the benefit of Korean Patent Application No. 10-2018-0097200, filed on Aug. 21, 2018, in the Korean Intellectual Property Office, the disclosure of which is incorporated herein in its entirety by reference.

BACKGROUND

1. Field

The present invention relates to a method of preparing powder and, more particularly, to a method of preparing cerium boride powder.

2. Description of the Related Art

Cerium boride is a compound of cerium (Ce) and boron (B), and $CeB_4$ and $CeB_6$ are known. Utilization of cerium boride as a thermoelectric material, a magnetic material, and an electronic material are expected due to unique electromagnetic properties thereof. In addition, after recently reported that cerium boride powder has excellent catalytic properties for enhancing hydrogenation of a hydrogen storage material, usability of cerium boride as a catalyst attracts attention (Journal of Materials Chemistry A1 (2013) 9752-9759).

Cerium boride may be synthesized using various methods described below.

(1) Monocrystalline $CeB_6$ nanowires are vapor-deposited on a platinum (Pt)-coated silicon (Si) substrate at high temperature by using cerium chloride ($CeCl_3$) powder, boron chloride ($BCl_3$) gas, and hydrogen ($H_2$) gas (Journal of The American Chemical Society 127 (2005) 8002-8003).

(2) $CeB_6$ nanoparticles are synthesized by heating $CeCl_3$, boron oxide ($B_2O_3$), and excess magnesium (Mg) in an argon (Ar) atmosphere at 500° C. for 12 hours, or by heating $CeCl_3$, sodium borohydride ($NaBH_4$), and excess Mg in an Ar atmosphere at 400° C. for 48 hours (Journal of Solid State Chemistry 182 (2009) 3098-3104).

(3) $CeB_6$ particles are synthesized by milling cerium oxide ($CeO_2$), $B_2O_3$, and Mg powder in an agate mortar and heating the milled powder in an Ar atmosphere in a carbon (C) crucible heated to 1000° C., or by milling $CeO_2$, $B_2O_3$, and Mg powder in a carbon steel vessel together with carbon steel balls by using a planetary mill for 30 hours (International Journal of Materials Research 104 (2013) 403-407).

(4) $CeB_6$ particles are synthesized by milling $CeO_2$, $B_2O_3$, and Mg powder in a hardened chromium steel vessel together with hardened carbon steel balls by using a horizontal planetary mill in an Ar atmosphere (Journal of the Chinese Chemical Society 63 (2016) 379-384).

The above methods have problems described below.

In the method (1), $CeB_6$ is synthesized at a high temperature of 1125° C. on the Si substrate coated with a Pt catalyst. The $BCl_3$ gas used for synthesis is very harmful to the human body even when exposed to only a small amount thereof.

In the method (2), $CeB_6$ is synthesized at a medium or low temperature of 400° C. to 500° C. for a long time, e.g., 12 hours to 48 hours. In addition, $CeB_6$ is synthesized in an inert gas atmosphere. Since a crystal grain size of $CeB_6$ is increased due to the high-temperature long-time process, this method is not usable to prepare, for example, a catalyst having a small crystal grain size.

In the methods (3) and (4), $CeB_6$ particles are synthesized using heat of reaction over 2000 kJ inside a mill. Thus, the particles may be synthesized at room temperature without a heater. However, synthesis is performed in an inert gas atmosphere and the synthesized $CeB_6$ has a large crystal grain size. As such, these methods are not usable to prepare, for example, a catalyst having a small crystal grain size.

RELATED ART DOCUMENTS

Non-Patent Documents (Non-patent Document 1) Journal of The American Chemical Society 127 (2005) 8002-8003

(Non-patent Document 2) Journal of Solid State Chemistry 182 (2009) 3098-3104

(Non-patent Document 3) International Journal of Materials Research 104 (2013) 403-407

(Non-patent Document 4) Journal of the Chinese Chemical Society 63 (2016) 379-384

SUMMARY

The present invention provides a method of economically preparing cerium boride powder having a crystal grain size of about 20 nm and a particle size equal to or less than 5 μm at room temperature based on a simple process. However, the scope of the present invention is not limited thereto.

According to an aspect of the present invention, there is provided a method of preparing cerium boride powder, the method including a first step for generating mixed powder by mixing at least one selected from among cerium chloride ($CeCl_3$) powder and cerium oxide ($CeO_2$) powder, at least one selected from among magnesium hydride ($MgH_2$) powder and magnesium (Mg) powder, and boron oxide ($B_2O_3$) powder, a second step for generating composite powder including cerium boride ($Ce_xB_y$) and at least one selected from among magnesium oxide (MgO) and magnesium chloride ($MgCl_2$), by causing reaction in the mixed powder at room temperature based on a ball milling process, and a third step for selectively depositing cerium boride powder by dispersing the composite powder in a solution.

The first step may include generating the mixed powder by mixing the $CeCl_3$ powder, the $MgH_2$ powder, and the $B_2O_3$ powder, and the third step may include selectively dissolving $MgCl_2$ and MgO and selectively depositing the cerium boride powder by dispersing the composite powder in an acidic solution.

The first step may include generating the mixed powder by mixing the $CeCl_3$ powder, the $MgH_2$ powder, and the $B_2O_3$ powder, and the third step may include selectively dissolving $MgCl_2$ and obtaining deposited powder by dispersing the composite powder in a solution, and removing MgO and obtaining the cerium boride powder by adding acid to the deposited powder.

The first step may include generating the mixed powder by mixing the $CeO_2$ powder, the $MgH_2$ powder, and the $B_2O_3$ powder, and the third step may include selectively dissolving MgO and selectively depositing the cerium boride powder by dispersing the composite powder in an acidic solution.

The first step may include generating the mixed powder by mixing the $CeO_2$ powder, the Mg powder, and the $B_2O_3$ powder, and the third step may include selectively dissolving MgO and selectively depositing the cerium boride powder by dispersing the composite powder in an acidic solution.

In the second step, the ball milling process may include a process of putting balls and the mixed powder in a reaction vessel, filling air, argon (Ar), helium (He), nitrogen ($N_2$), or hydrogen ($H_2$) gas in the reaction vessel, and then performing ball milling.

The ball milling process may include a high-energy ball milling process selected from among a shaker mill process, a vibratory mill process, a planetary mill process, and an attritor mill process.

In the third step, the cerium boride powder may have a particle size equal to or less than 5 μm and a crystal grain size of 20 nm.

The third step may be performed at room temperature.

The cerium boride powder prepared using the mixed powder including the $MgH_2$ powder may have a crystal grain size less than a crystal grain size of the cerium boride powder prepared using the mixed powder including the Mg powder.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
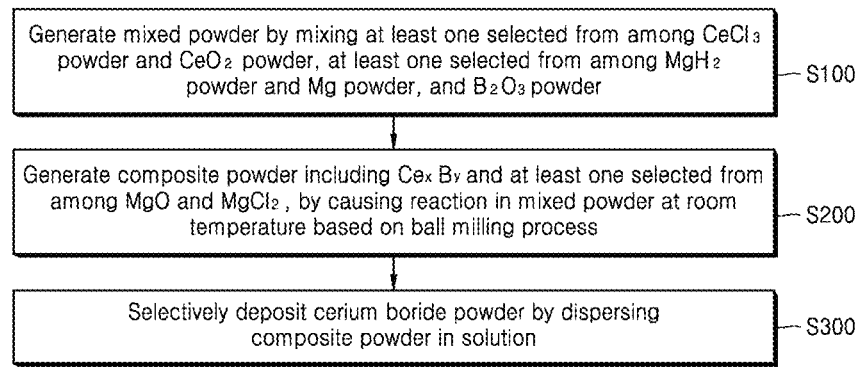
FIG. 1 is a flowchart of a method of preparing cerium boride powder, according to an embodiment of the present invention.

The present invention will now be described more fully with reference to the accompanying drawings, in which embodiments of the invention are shown. The invention may, however, be embodied in many different forms and should not be construed as being limited to the embodiments set forth herein, rather, these embodiments are provided so that this disclosure will be thorough and complete, and will fully convey the concept of the invention to one of ordinary skill in the art. In the drawings, like reference numerals denote like elements and the sizes of at least some elements may be exaggerated or reduced for clarity of explanation.

The terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless defined differently, all terms used in the description including technical and scientific terms have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning. In the following description of the present invention, a detailed description of known functions and configurations incorporated herein will be omitted when it may make the subject matter of the present invention unclear.

The present invention provides a method of economically preparing cerium boride powder having a particle size equal to or less than 5 μm and a small crystal grain size of about 20 nm by performing high-energy ball milling on mixed powder of boron oxide ($B_2O_3$) powder, one or a combination of magnesium (Mg) powder and magnesium hydride ($MgH_2$) powder, and one or a combination of cerium chloride ($CeCl_3$) powder and cerium oxide ($CeO_2$) powder at room temperature in a vessel filled with air, inert gas, or hydrogen ($H_2$) gas.

The present invention relates to a method of preparing cerium boride powder and, more particularly, to a method of preparing cerium boride powder by mixing $B_2O_3$ powder, one or a combination of Mg powder and $MgH_2$ powder, and one or a combination of $CeCl_3$ powder and $CeO_2$ powder and causing chemical reaction between particles of the mixed powder based on high-energy ball milling.

That is, the present invention relates to a method of preparing cerium boride ($Ce_xB_y$) powder by causing mechanical chemical reaction in mixed power of $B_2O_3$ powder, one or a combination of Mg powder and $MgH_2$ powder, and one or a combination of $CeCl_3$ powder and $CeO_2$ powder based on high-energy ball milling, removing by-products of reaction, e.g., MgO and $MgCl_2$, from the powder, and collecting $CeB_6$ powder. According to the present invention, cerium boride powder having a crystal grain size of about 20 nm and a particle size equal to or less than 5 μm may be economically prepared at room temperature based on a simple process.

A method of preparing cerium boride powder, according to the present invention, includes mixing $B_2O_3$ powder, one or a combination of Mg powder and $MgH_2$ powder, and one or a combination of $CeCl_3$ powder and $CeO_2$ powder, putting the mixture in a reaction vessel together with balls and filling air, argon (Ar), helium (He), nitrogen ($N_2$), or hydrogen ($H_2$) gas in the reaction vessel, synthesizing $Ce_xB_y$, MgO and $MgCl_2$ by performing high-energy ball milling on the mixture, selectively removing MgO and $MgCl_2$ from the reaction product by using an acidic solution, and depositing and collecting cerium boride powder.

Provided is a method of preparing cerium boride powder, the method including mixing $B_2O_3$ powder, one or a combination of $MgH_2$ powder and Mg powder, and one or a combination of $CeCl_3$ powder and $CeO_2$ powder at a mole ratio of a:b:c:d:e, generating composite powder including $Ce_xB_y$, MgO, and $MgCl_2$ by putting the mixed powder in a reaction vessel together with balls, filling air, Ar, He, $N_2$, or $H_2$ gas in the reaction vessel, and then performing high-energy ball milling, selectively dissolving $MgCl_2$ and MgO and selectively depositing and separating cerium boride powder by dispersing the generated composite powder in an acidic solution. Herein, a, b, c, d, e, x, and y are real numbers.

Embodiments of the present invention will now be described in detail with reference to the attached drawings.

FIG. 1 is a flowchart of a method of preparing cerium boride powder, according to an embodiment of the present invention.

Referring to FIG. 1, the method of preparing cerium boride powder, according to an embodiment of the present invention, includes a first step S100 for generating mixed powder by mixing at least one selected from among cerium chloride ($CeCl_3$) powder and cerium oxide ($CeO_2$) powder, at least one selected from among magnesium hydride ($MgH_2$) powder and magnesium (Mg) powder, and boron oxide ($B_2O_3$) powder, a second step S200 for generating composite powder including cerium boride ($Ce_xB_y$) and at least one selected from among magnesium oxide (MgO) and magnesium chloride ($MgCl_2$), by causing reaction in the mixed powder at room temperature based on a ball milling process, and a third step S300 for selectively depositing cerium boride powder by dispersing the composite powder in a solution.

According to an example of the method of preparing cerium boride powder, the first step S100 may include generating the mixed powder by mixing the $CeCl_3$ powder, the $MgH_2$ powder, and the $B_2O_3$ powder, and the third step S300 may include selectively dissolving $MgCl_2$ and MgO and selectively depositing the cerium boride powder by dispersing the composite powder in an acidic solution. According to a modified example thereof, the third step S300 may include selectively dissolving $MgCl_2$ and obtaining deposited powder by dispersing the composite powder in a solution, and removing MgO and obtaining the cerium boride powder by adding acid to the deposited powder that is not necessarily acidic.

According to another example of the method of preparing cerium boride powder, the first step S100 may include generating the mixed powder by mixing the $CeO_2$ powder, the $MgH_2$ powder, and the $B_2O_3$ powder, and the third step S300 may include selectively dissolving MgO and selectively depositing the cerium boride powder by dispersing the composite powder in an acidic solution. According to a modified example thereof, the third step S300 may include obtaining deposited powder by dispersing the composite powder in a solution that is not necessarily acidic, and removing MgO and obtaining the cerium boride powder by adding acid to the deposited powder.

According to another example of the method of preparing cerium boride powder, the first step S100 may include generating the mixed powder by mixing the $CeO_2$ powder, the Mg powder, and the $B_2O_3$ powder, and the third step S300 may include selectively dissolving MgO and selectively depositing the cerium boride powder by dispersing the composite powder in an acidic solution. According to a modified example thereof, the third step S300 may include obtaining deposited powder by dispersing the composite powder in a solution that is not necessarily acidic, and removing MgO and obtaining the cerium boride powder by adding acid to the deposited powder.

Based on the method of preparing cerium boride powder, according to the present invention, in the first step S100, the mixed powder is generated by mixing the $CeCl_3$ powder, the $CeO_2$ powder, the $B_2O_3$ powder, the Mg powder, and the $MgH_2$ powder at a mole ratio of a:b:c:d:e, where a, b, c, d, and e are zero or positive real numbers.

In the second step S200, the mixed powder is put in a vessel together with balls, air, inert gas, or hydrogen ($H_2$) gas is filled in the vessel, and then high-energy ball milling is performed using a shaker mill, a vibratory mill, a planetary mill, or an attritor mill. As such, $Ce_xB_y$, $MgCl_2$, and MgO are synthesized by causing reaction between particles of the mixed powder as shown below. $H_2$ gas generated due to the reaction is discharged when the vessel is open.

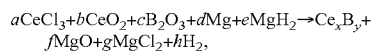

$aCeCl_3+bCeO_2+cB_2O_3+dMg+eMgH_2 \rightarrow Ce_xB_y+ fMgO+gMgCl_2+hH_2$, where a, b, c, d, e, f, g, h, x, and y are zero or positive real numbers.

The composite powder generated in the second step S200 may include at least one selected from among MgO and $MgCl_2$. When the mixed power of the first step S100 includes the $CeCl_3$ powder, the composite powder may include $MgCl_2$.

In the third step S300 for selectively depositing the cerium boride powder by dispersing the composite powder in the solution, the solution may be an acidic solution. MgO and $MgCl_2$ may be dissolved in the acidic solution. $MgCl_2$ may also be dissolved a non-acidic solution but MgO may not be easily dissolved a non-acidic solution.

After the composite powder is dispersed in the acidic solution, the cerium boride powder is deposited and collected at room temperature in an air atmosphere. In this process, $MgCl_2$ may be dissolved in the solution and MgO may be removed from $Ce_xB_y$ by acid.

Embodiment 1

According to the process order of FIG. 1, $CeCl_3$ powder, $B_2O_3$ powder, and $MgH_2$ powder are mixed at a mole ratio of 2:6:21, the mixed powder is put in a high-speed steel vessel in an air atmosphere together with six 12.7-mm-diameter chromium (Cr) steel balls and two 10-mm-diameter Cr steel balls at a weight ratio of about 1:39, and then high-energy ball milling is performed using a shaker mill for 2 hours. The milled powder is dispersed in acid-added ethanol and then deposited powder is collected.

Figure 2:
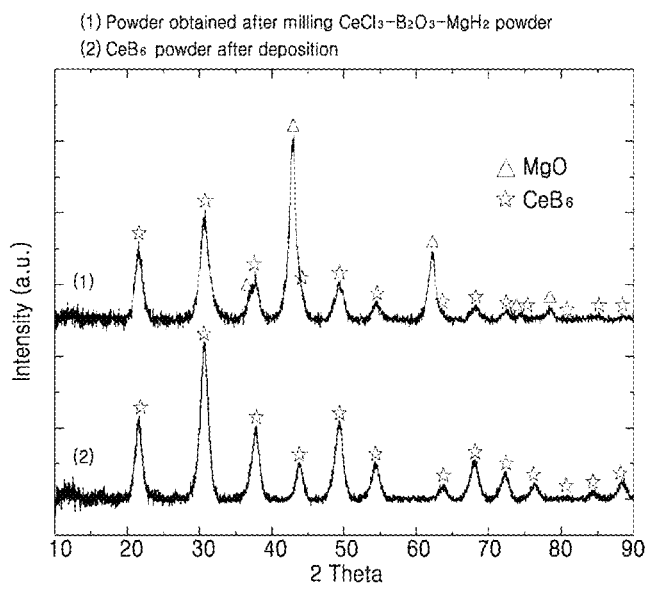
FIG. 2 is a graph showing X-ray diffraction patterns of composite powder (1) obtained by performing high-energy ball milling on mixed powder of boron oxide ($B_2O_3$) powder, cerium chloride ($CeCl_3$) powder, and magnesium hydride ($MgH_2$) powder, and cerium boride powder (2) obtained by selectively removing magnesium oxide (MgO) and magnesium chloride ($MgCl_2$) from the composite powder (1) by using an acidic solution.

FIG. 2 is a graph showing X-ray diffraction patterns of the milled powder (1) and the powder (2) collected from the acidic solution. The X-ray diffraction pattern of the milled powder (1) shows that $CeB_6$ and MgO are well synthesized due to chemical reaction using high-energy ball milling. $MgCl_2$ is amorphized due to room temperature milling and is not shown on the X-ray diffraction pattern. The X-ray diffraction pattern of the powder (2) collected from the acidic solution shows that only pure $CeB_6$ is well collected. It is also shown that, since particles of the cerium boride powder have a very small crystal grain size, peaks of the X-ray diffraction pattern are broadened. The crystal grain size calculated using the Scherrer equation based on full width at half maximum (FWHM) values of the peaks is about 20 nm.

Figure 3:
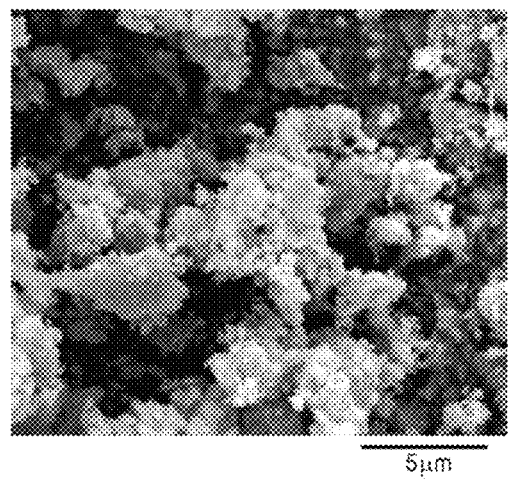
FIG. 3 is a scanning electron microscopy (SEM) image of cerium boride powder prepared according to the present invention.

FIG. 3 is a scanning electron microscopy (SEM) image of the cerium boride powder prepared using the method of Embodiment 1. It is shown that most particles of the powder have an irregular shape and have a small particle size equal to or less than 5 μm.

Figure 4:
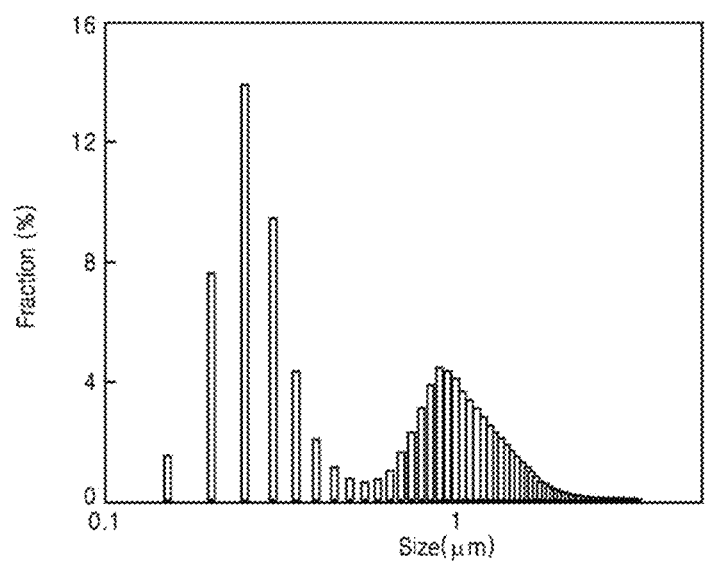
FIG. 4 is a graph showing a result of analyzing the cerium boride powder prepared according to the present invention, by using a laser particle size analyzer.

FIG. 4 is a graph showing a result of analyzing a particle size of the cerium boride powder prepared using the method of Embodiment 1, by using a laser particle size analyzer. It is shown that particles having a size of about 250 nm particles having a size of about 1 μm are mixed and that 99% of entire powder particles have a particle size equal to or less than 2.4 μm.

Embodiment 2

According to the process order of FIG. 1, $CeO_2$ powder, $B_2O_3$ powder, and $MgH_2$ powder are mixed at a mole ratio of 1:3:11, the mixed powder is put in a high-speed steel vessel in an air atmosphere together with six 12.7-mm-diameter Cr steel balls and two 10-mm-diameter Cr steel balls at a weight ratio of about 1:39, and then high-energy ball milling is performed using a shaker mill for 2 hours. The milled powder is dispersed in acid-added ethanol and then deposited powder is collected.

Figure 5:
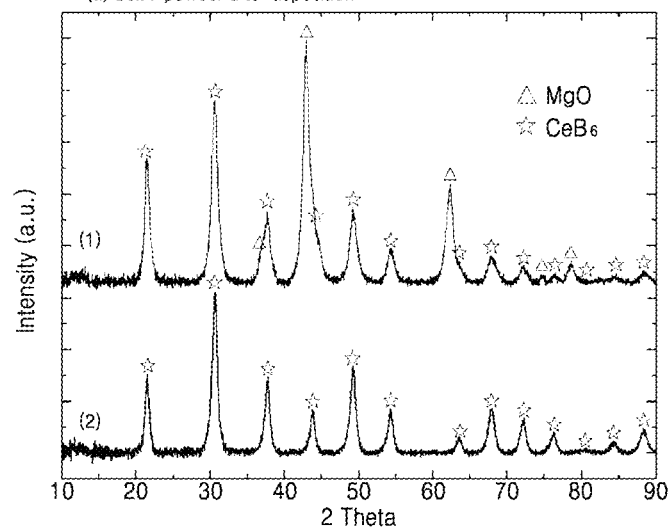
FIG. 5 is a graph showing X-ray diffraction patterns of composite powder (1) obtained by performing high-energy ball milling on mixed powder of $B_2O_3$ powder, cerium oxide ($CeO_2$) powder, and $MgH_2$ powder, and cerium boride powder (2) obtained by selectively removing MgO from the composite powder (1) by using an acidic solution.

FIG. 5 is a graph showing X-ray diffraction patterns of the milled powder (1) and the powder (2) collected from the acidic solution. The X-ray diffraction pattern of the milled powder (1) shows that $CeB_6$ and MgO are well synthesized due to chemical reaction using high-energy ball milling. The X-ray diffraction pattern of the powder (2) collected from the acidic solution shows that only pure $CeB_6$ is well collected. Overall, the X-ray diffraction pattern of $CeB_6$ does not greatly differ from that according to Embodiment 1.

Embodiment 3

According to the process order of FIG. 1, $CeO_2$ powder, $B_2O_3$ powder, and Mg powder are mixed at a mole ratio of 1:3:11, the mixed powder is put in a high-speed steel vessel in an air atmosphere together with six 12.7-mm-diameter Cr steel balls and two 10-mm-diameter Cr steel balls at a weight ratio of about 1:39, and then high-energy ball milling is performed using a shaker mill for 2 hours. The milled powder is dispersed in acid-added ethanol and then deposited powder is collected.

Figure 6:
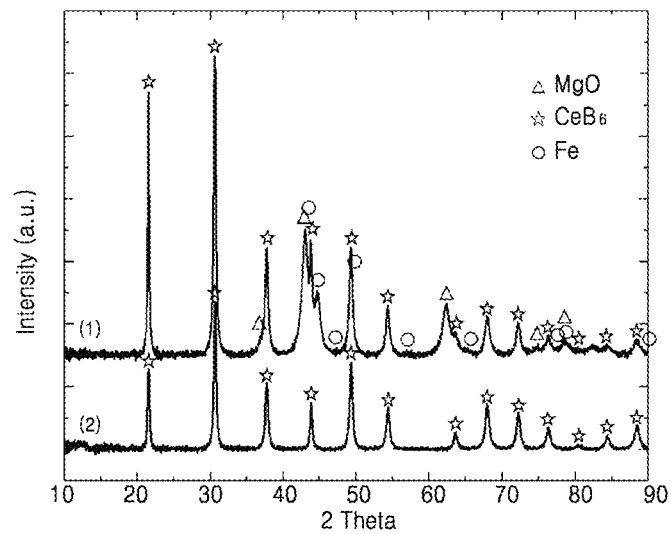
FIG. 6 is a graph showing X-ray diffraction patterns of composite powder (1) obtained by performing high-energy ball milling on mixed powder of $B_2O_3$ powder, $CeCl_3$ powder, and magnesium (Mg) powder, and cerium boride powder (2) obtained by selectively removing MgO and $MgCl_2$ from the composite powder (1) by using an acidic solution.
Figure 7A:
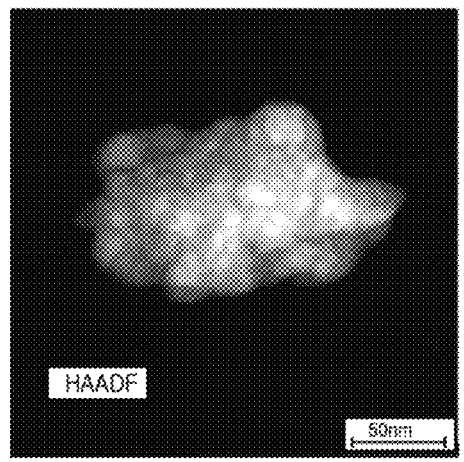
FIG. 7A shows a dark field image obtained by performing transmission electron microscopy (TEM) analysis on cerium boride powder prepared using $CeO_2$ powder, $B_2O_3$ powder, and $MgH_2$ powder.
Figure 7B:
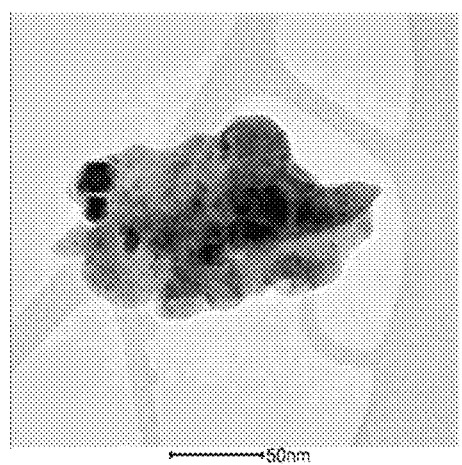
FIG. 7B shows a bright field image obtained by performing transmission electron microscopy (TEM) analysis on cerium boride powder prepared using $CeO_2$ powder, $B_2O_3$ powder, and $MgH_2$ powder.
Figure 7C:
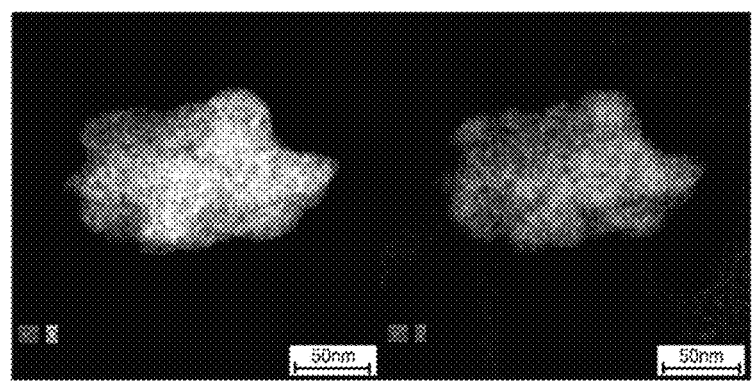
FIG. 7C shows a composition mapping image obtained by performing transmission electron microscopy (TEM) analysis on cerium boride powder prepared using $CeO_2$ powder, $B_2O_3$ powder, and $MgH_2$ powder.
Figure 7D:
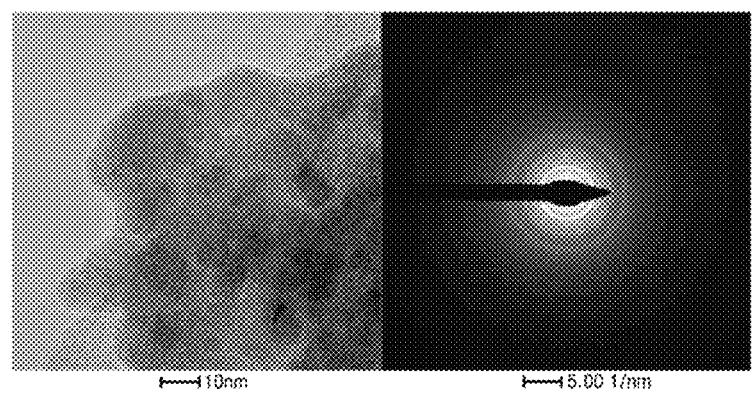
FIG. 7D shows an electron diffraction pattern image obtained by performing transmission electron microscopy (TEM) analysis on cerium boride powder prepared using $CeO_2$ powder, $B_2O_3$ powder, and $MgH_2$ powder.
Figure 8A:
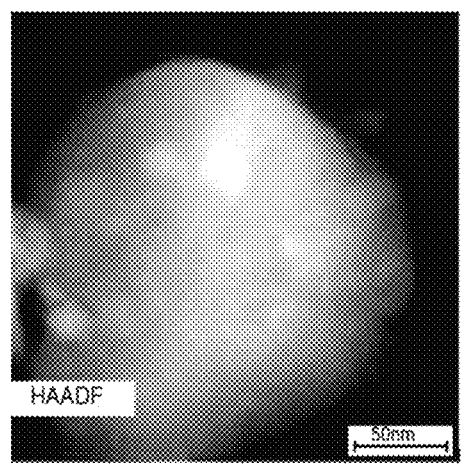
FIG. 8A shows a dark field image obtained by performing TEM analysis on cerium boride powder prepared using $CeO_2$ powder, $B_2O_3$ powder, and Mg powder.
Figure 8B:
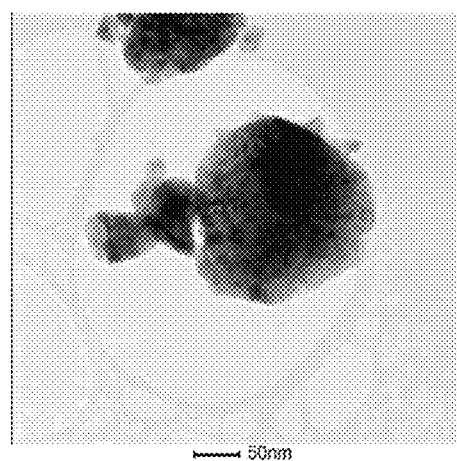
FIG. 8B shows a bright field image obtained by performing TEM analysis on cerium boride powder prepared using $CeO_2$ powder, $B_2O_3$ powder, and Mg powder.
Figure 8C:
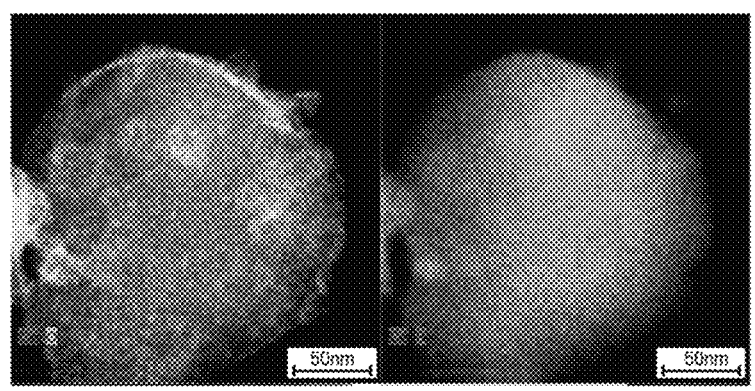
FIG. 8C shows a composition mapping image obtained by performing TEM analysis on cerium boride powder prepared using $CeO_2$ powder, $B_2O_3$ powder, and Mg powder.
Figure 8D:
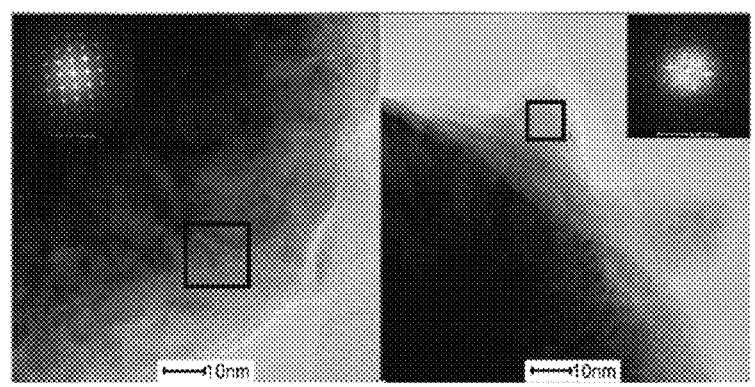
FIG. 8D shows an electron diffraction pattern image obtained by performing TEM analysis on cerium boride powder prepared using $CeO_2$ powder, $B_2O_3$ powder, and Mg powder.

FIG. 6 is a graph showing X-ray diffraction patterns of the milled powder (1) and the powder (2) collected from the acidic solution. The X-ray diffraction pattern of the milled powder (1) shows that $CeB_6$ and MgO are well synthesized due to chemical reaction using high-energy ball milling. However, an X-ray diffraction pattern of iron (Fe) added due to wear and tear on the vessel and the balls during milling is additionally shown. The X-ray diffraction pattern of the powder (2) collected from the acidic solution shows that only pure $CeB_6$ is well collected. Compared to FIGS. 2 and 5, it is shown that heights of peaks of $CeB_6$ are increased and FWHM values thereof are reduced. This result means that $CeB_6$ prepared according to Embodiment 3 has a crystal grain size greater than that of $CeB_6$ prepared according to Embodiment 1 or 2.

It is shown above that the cerium boride powder prepared using the $CeO_2$ powder, the $B_2O_3$ powder, and the $MgH_2$ powder has a crystal grain size much less than that of the cerium boride powder prepared using the $CeO_2$ powder, the $B_2O_3$ powder, and the Mg powder, and a description thereof will now be provided.

FIG. 7 shows a dark field image (a), a bright field image (b), a composition mapping image (c), and an electron diffraction pattern image (d) obtained by performing transmission electron microscopy (TEM) analysis on cerium boride powder prepared using $CeO_2$ powder, $B_2O_3$ powder, and $MgH_2$ powder. Specifically, the cerium boride powder shown in FIG. 7 may be prepared using the above-described method according to Embodiment 2.

Referring to FIG. 7, the dark field image shows that a cerium boride powder particle having a size of about 200 nm includes multiple $Ce_xB_y$ crystal grains having a size of about 20 nm in average. The composition mapping image shows that all crystal grains are composed of cerium (Ce) and boron (B) and that a thin oxide layer is present on the surface of each crystal grain. The electron diffraction pattern image shows a ring pattern formed due to diffraction of a large number of very small crystal grains. The cerium boride powder including very small crystal grains is expected to exhibit excellent catalytic performance in the catalyst field due to a high specific surface area thereof.

FIG. 8 shows a dark field image (a), a bright field image (b), a composition mapping image (c), and an electron diffraction pattern image (d) obtained by performing TEM analysis on cerium boride powder prepared using $CeO_2$ powder, $B_2O_3$ powder, and Mg powder. Specifically, the cerium boride powder shown in FIG. 8 may be prepared using the above-described method according to Embodiment 2.

Referring to FIG. 8, it is shown that a cerium boride powder particle having a size of about 220 nm includes a single $Ce_xB_y$ crystal. The composition mapping image shows that the powder particle is composed of Ce and B and that a thin oxide layer is present on the surface of the powder particle. However, the electron diffraction pattern image does not show a ring pattern formed due to diffraction of a large number of very small crystal grains.

As such, it is shown that the cerium boride powder prepared using the $CeO_2$ powder, the $B_2O_3$ powder, and the $MgH_2$ powder has a crystal grain size much less than that of and has a specific surface area much higher than that of the cerium boride powder prepared using the $CeO_2$ powder, the $B_2O_3$ powder, and the Mg powder. It is expected that the higher specific surface area the cerium boride powder has, the better catalytic performance the cerium boride powder exhibits in the catalyst field.

According to the afore-described various embodiments of the present invention, cerium boride powder having a particle size equal to or less than 5 μm and a crystal grain size of 20 nm may be prepared at room temperature based on a simple and economical process by causing reaction between $B_2O_3$ powder, Mg or $MgH_2$ powder, and $CeCl_3$ or $CeO_2$ powder at room temperature based on high-energy ball milling, and then removing by-products of reaction, e.g., MgO and $MgCl_2$, by dissolving the by-products in an acidic solution. Particularly, compared to the Mg powder, the $MgH_2$ powder may be used to prepare cerium boride powder having a smaller crystal grain size. However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of preparing cerium boride powder, the method comprising:
   a first step, for generating a mixed powder, by mixing magnesium hydride ($MgH_2$) powder, boron oxide ($B_2O_3$) powder, and at least one selected from the group consisting of cerium (III) chloride ($CeCl_3$) powder and cerium (IV) oxide ($CeO_2$) powder;
   a second step, for generating a composite powder comprising cerium boride ($CeB_6$) and at least one selected from the group consisting of magnesium oxide (MgO) and magnesium chloride ($MgCl_2$), of reacting the mixed powder at room temperature in a ball milling process; and
   a third step, for selectively depositing cerium boride powder, of dispersing the composite powder in a solution.

2. The method of claim 1, wherein the first step comprises generating the mixed powder by mixing the $CeCl_3$ powder, the $MgH_2$ powder, and the $B_2O_3$ powder, and
   wherein the third step comprises selectively dissolving $MgCl_2$ and MgO and selectively depositing the cerium boride powder by dispersing the composite powder in an acidic solution.

3. The method of claim 1, wherein the first step comprises generating the mixed powder by mixing the $CeCl_3$ powder, the $MgH_2$ powder, and the $B_2O_3$ powder, and
   wherein the third step comprises selectively dissolving $MgCl_2$ and obtaining deposited powder by dispersing the composite powder in a solution and removing MgO and obtaining the cerium boride powder by adding acid to the deposited powder.

4. The method of claim 1, wherein the first step comprises generating the mixed powder by mixing the $CeO_2$ powder, the $MgH_2$ powder, and the $B_2O_3$ powder, and
   wherein the third step comprises selectively dissolving MgO and selectively depositing the cerium boride powder by dispersing the composite powder in an acidic solution.

5. The method of claim 1, wherein, in the second step, the ball milling process comprises a process of putting balls and the mixed powder in a reaction vessel, filling air, argon (Ar), helium (He), nitrogen ($N_2$), or hydrogen ($H_2$) gas in the reaction vessel, and then performing ball milling.

6. The method of claim 5, wherein the ball milling process comprises a high-energy ball milling process selected from a process consisting of a shaker mill process, a vibratory mill process, a planetary mill process, and an attritor mill process.

7. The method of claim 1, wherein, in the third step, the cerium boride powder has a particle size equal to or less than 5 μm and a crystal grain size of 20 nm.

8. The method of claim 1, wherein the third step is performed at room temperature.

9. The method of claim 1, wherein the cerium boride powder prepared using the mixed powder comprising the $MgH_2$ powder has a crystal grain size less than a crystal grain size of a cerium boride powder prepared using a mixed powder comprising Mg powder.

* * * * *